PARTY LINE SUBSTATION IDENTIFICATION SYSTEM

Filed Dec. 23, 1957

Inventors
STANLEY B. OST
BORIS DZULA
By [signature]
Attorney 3,025,354

PARTY LINE SUBSTATION IDENTIFICATION SYSTEM

Stanley B. Ost, Brooklyn, N.Y., and Boris Dzula, Clifton, N.J., assignors to International Telephone and Telegraph Corporation, Nutley, N.J., a corporation of Maryland Filed Dec. 23, 1957, Ser. No. 704,395
5 Claims. (Cl. 179—17)

Figures 1, 2:
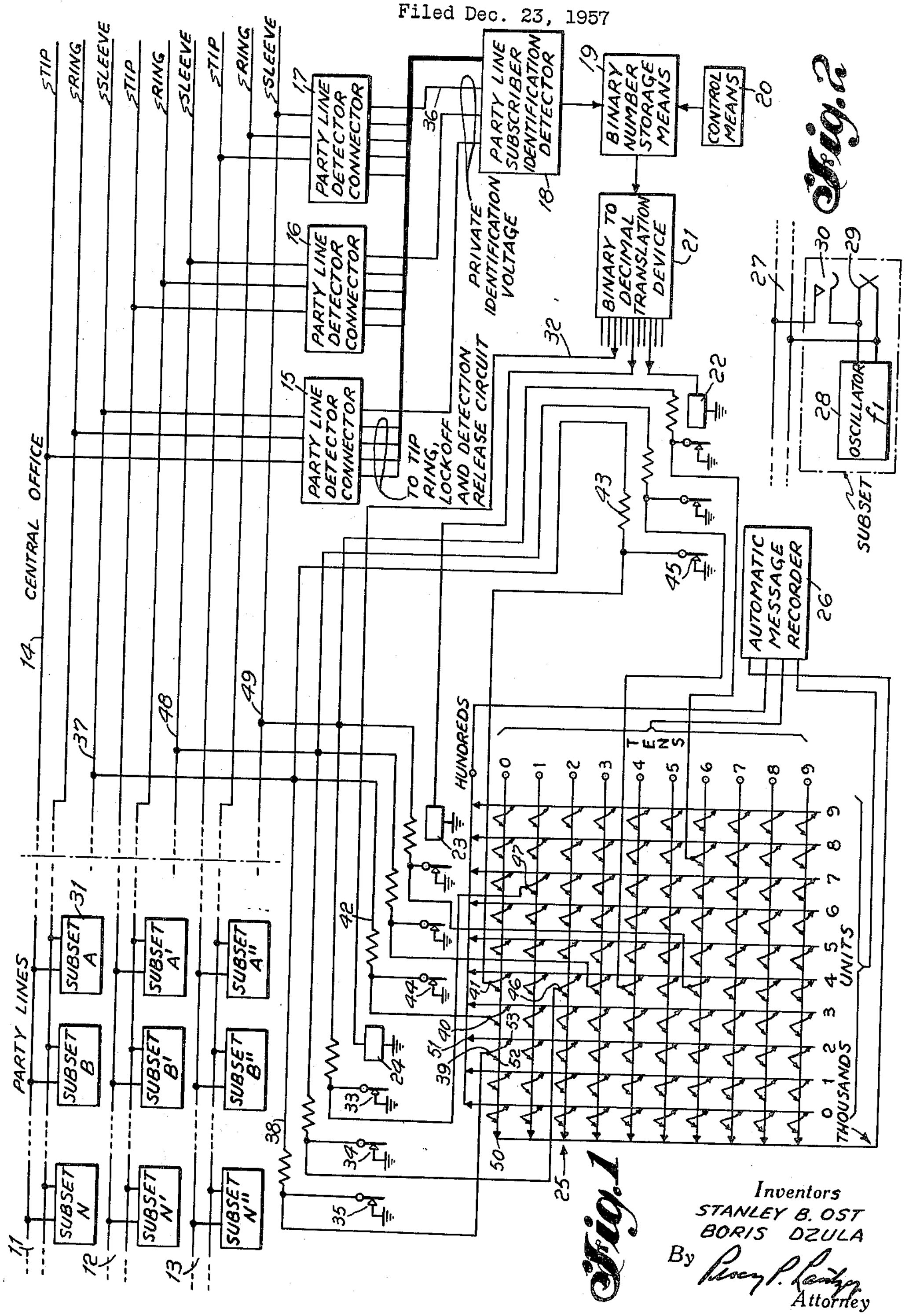

This invention relates to telephone systems and more particularly to automatic ticketing systems wherein there is required an identification of a party line sub-station multi-party arrangement.

In party line systems which are used in automatic ticketing telephone systems there has been the problem of identifying the calling party. If the party line system is a terminal per line arrangement, then each party's directory number is represented by the same line number and a party number. The directory number is obtained in two operations, one of determining the line number and the other of determining the party number. Such a system is somewhat inflexible and, with respect to the automatic ticketing of a call, requires that the line number be combined in a computer or data processing arrangement with the party identifying number. This latter party identifying number is transmitted to the system by either a frequency tone assigned to each of the telephone sets on the party line or possibly by a circle digit arrangement whereby the subscriber dials his own assigned circle digit to identify himself. In the terminal per station arrangement there is more flexibility than in the last-mentioned arrangement. If terminal per station operation is used, the various parties on a party line may be assigned numbers such that there is a random relationship between the directory numbers used and the line numbers. This last-mentioned system, however, must still provide for the combining of the line number and the station identifying number by means of a data processing system in order that, for instance, the directory number might be passed to the automatic message recorder or automatic ticketing system for monthly billing purposes.

An object of the present invention is to provide an improved means for identifying a party in a party line telephone system to be used with an automatic information encoder arrangement.

Another object of the present invention is to provide a highly flexible identification means such that two parties on the same party line can be assigned random varying telephone numbers.

Another object of the present invention is to provide a party identification system which will permit the party subset to be assigned a telephone directory number which can be used without conversion in the data processing portion of automatic ticketing apparatus.

In accordance with a main feature of the present invention, there is provided a relay for each possible party (up to and including 10 parties) in any exchange arranged in such a manner that the identifying voltage for a particular party can be applied to a random location of a diode matrix when said assigned relay is energized.

Another feature of the present invention is the provision of a ground connection through the normally closed points of the above-mentioned relays such that the identifying voltage which might be applied to the various diode matrix locations of the parties not initiating the call will be shorted out and therefore ineffective.

The foregoing and other objects and features of this invention and the manner of attaining them will become more apparent and the invention itself will be best understood by reference to the following description of an embodiment of the invention taken in conjunction with the accompanying drawings, wherein:

FIG. 1 is a schematic and block diagram showing the party line connections into the central office and the identifying diode matrix with the assigned relays; and FIG. 2 is a schematic block diagram of an individual subset of a party line.

Referring specifically to FIG. 1, there are three party lines 11, 12 and 13, each respectively having three subsets connected thereto. Party line 11 has subsets A, B and N, party line 12 has subsets A', B' and N', and party line 13 has subsets A'', B'' and N''. The three party lines 11, 12 and 13 are shown connected to the central office 14 whereat to each of these party lines there is assigned a tip, ring and sleeve line. To the combination tip, ring and sleeve lines there are connected respectively the party line detector connectors 15, 16 and 17. The party line detector connector 15 is operative for the party line 11, the party line detector connector 16 is operative for the party line 12 and the party line detector connector 17 is operative for the party line 13. The party line detector connectors as used in connection with this disclosure can be any well-known switching device used in the telephony art and in particular can be the system described in the co-pending application "Party Line Detector Connector" by R. C. P. Hinton, Serial No. 695,637, filed November 8, 1957.

The party line detector connector devices are connected to the party line subscriber identification detector 18. The party line subscriber identification detector can be any of the well-known devices used in the telephony art for either accepting a circle digit and passing this information in a binary form to a storage device, such as a drum, or in particular can be the frequency tone arrangement described in the co-pending application "Party Line Subscriber Identifier" by H. Herbig-L. Medler, Serial No. 684,140, filed September 16, 1957.

The party line subscriber identification detector 18 is connected to the binary number storage device 19 which is connected and controlled by the control means 20. The binary number storage means can be any well-known storage means used in the automatic ticketing systems, or computer devices, such as a magnetic drum or magnetic tape; and the control means 20 can represent that portion of the automatic ticketing system which indicates that the call has been answered, or that the call has been unanswered or the calling party has completed his dialing depending on which of the automatic ticketing systems is used.

The binary number storage means 19 is connected to the binary-to-decimal translation circuit 21. There is shown ten outputs from the translation circuit 21 for purposes of illustration, to indicate that if there were ten parties on a party line there would be ten relays assigned to this system. The relays 22, 23 and 24 are connected to the outputs of the binary-to-decimal translation circuit.

The subscriber station identifying diode matrix 25 is coupled to the respective sleeve lines of the party lines assigned to the central office. The diode matrix shown in FIG. 1 can be assumed to have permanently assigned thousands and hundreds values and only one such matrix is shown for purposes of illustration. It is to be understood that there could be additional such matrices shown so that the subscriber stations to be identified could be coupled to these other matrices and differ in the thousands and hundreds value as well as in the tens and units, as will be illustrated hereinafter.

The outputs of the matrix 25 are connected to the automatic message recorder 26. The automatic message recorder 26 represents any one of a number of data processing systems which are used in connection with telephone automatic ticketing and is shown for purposes of illustration of utility of the present invention and not as a part of the present invention.

FIG. 2 shows a block and schematic diagram of one of the subsets. There is a party line shown at 27 across which there is connected an oscillator 28 through the dial contacts 29 and receiver contacts 30 which latter contacts are open when the receiver is in place.

To understand the operation of the present invention, let us assume that the party using subset A at 31 is initiating a call for which there is to be an automatic ticketing at the automatic message recorder device 26. When the party at subset A lifts the receiver, the receiver contacts, such as the contacts 30, FIG. 2, are closed and a signal tone $f_1$, such as provided at oscillator 28, is transmitted to the party lines 11 and thence to the central office 14. The party line detector connector 15, which is associated with the party line 11 and which responds to the dialing operation of the party using subset A, connects the party line 11 to the party line subscriber identification detector 18. As suggested above, the description of this operation is clearly outlined in the co-pending application of Hinton entitled, "Party Line Detector Connector." It is also to be understood that the user of the subset A might be identifying that particular station by dialing a circle digit and the circle digit would play the same role as the identifying tone $f_1$ in this illustration.

Carrying forth with the illustration, the identifying tone through proper filtering circuits in the party line subscriber identification detector 18 identifies the subset A. Assume that the subset A has been assigned a tone $f_1$ which is translated to the binary number 3. The binary number 3 is stored at the binary number storage means 19, and, at a proper signal from the control means 20, passes the binary number to the binary-to-decimal translation circuit 21. At the translation circuit 21 the binary number is translated into a decimal number and is passed as a relay energization signal along the line 32 to the relay 24. In response to this signal, the relay 24 is energized and the relay points 33, 34 and 35 are transferred to remove the ground connections from their respective circuits. The private identification voltage which is transmitted from the party line subscriber identification detector 18 along the line 36 through the detector connector 15, is applied by means of the respective sleeve lines to the matrix 25. In our illustration this is the private identification voltage applied by means of the sleeve line 37 through the series resistance line 38 to the matrix location 39.

The matrix location 39 is tied to the thousand's position line through the diode connection at 50, to the hundred's position line through diode connection 51, to the ten's position line through diode connection 52, and to the unit's position line through diode connection 53. If we assume that our permanently fixed thousands position is assigned the number 8 and our permanently fixed hundred's position is assigned the number 1; our subscriber subset A in our illustration has been assigned the telephone directory number 8102 since the diode connection 52 is connected to the zero ten's position and diode connection 53 is connected to the "2" unit's position.

The private identification voltage being applied to the sleeve line 37 would create a voltage condition that would effect the matrix conditions at locations 40 and 41 respectively through the resistance series connections 42 and 43 if it were not for the fact that the respective relay transfer points 44 and 45 are holding the above described lines connected to ground. The relays 22 and 23 have not been energized, because the proper calling party with an identification number which would cause these relays to be energized is not initiating the call.

Although the relay points 33 and 34 have been transferred by the energization of the relay 24, the assigned matrix locations 46 and 47 do not respond because there has been no private identification voltage applied to the sleeve lines 48 and 49. It is to be noted that the subsets A, B and N which are assigned to the party line 11 can have the telephone directory numbers and identical matrix numbers of respectively 8102, 8103 and 8104. It is also clear from FIG. 1 that the subsets A′, B′ and N′ which are coupled to the party line 12 can have the telephone directory numbers and identical matrix numbers respectively 8124, 8134 and 8144.

For purposes of showing flexibility it is to be noted that the subsets A″, B″ and N″ which are coupled to the party line 13 have the respective telephone and matrix numbers 8117, 8164 and 8168. By being able to provide the subscriber with a matrix number which is identical to his telephone directory number, the information can be directly passed to the automatic message recorder for billing purposes wherein it will not be required to have a further transition of this number since the telephone bills will carry the telephone subscriber's own directory number.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a telephone system, a central office, a plurality of subscriber stations, a plurality of telephone lines each respectively connecting a number of said stations to said central office, tone signal generating means located respectively at each of said subscriber stations to transmit a signal therefrom when a call is attempted, tone detector means located at said central office to detect each of said station signals in relation to any other station signal transmitted on the same line, a plurality of relays having associated relay points, each of said relays coupled to said detector means and responsive to an asisgned detected signal, and a plurality of station number identifying means each coupled to an assigned relay point to respond in accordance with the response of the assigned relay, each of said identifying means comprising a resistor and a pair of diodes coupled to said assigned relay point.

2. A telephone system according to claim 1, wherein each of said station number identifying means includes a diode matrix common to said lines.

3. In a telephone system, a central office, a plurality of subscriber stations, a plurality of telephone lines each respectively connecting a number of said stations to said central office, an oscillator means located respectively at each of said subscriber stations to generate a frequency signal to identify its assigned station when a call is attempted, a network of frequency signal filter means located at said central office to detect each of said station frequency signals in relation to any other station frequency signal transmitted on the same line, said network of frequency filters having output means arranged to translate a frequency signal into a binary number indication, a plurality of relays having assigned relay points coupled to said frequency filter network and responsive to an assigned, detected signal, and a plurality of diode matrices having particular points thereon each coupled to an associated relay point to generate a station number therethrough in accordance with the response of an associated relay, each point on a diode matrix having a pair of diodes coupled thereto and each relay point being coupled to its associated line through a resistor.

4. In a telephone system, a central office, a plurality of subscriber stations, a plurality of telephone lines each respectively connecting a number of said stations to said central office, tone signal generating means located respectively at each of said subscriber stations to transmit a signal therefrom when a call is attempted, tone signal detector means located at said central office to detect each of said station signals in relation to any other station signal transmitted on the same line, and station number identifying means including a diode matrix common to said lines and coupled to said detector means and respective to said detector signal for effecting a non-ambiguous identification of each of said subscriber stations in relation to said plurality of subscriber stations associated with said central office, said station number identifying means comprising a plurality of relays having associated relay points, each relay coupled to said detector means and responsive to an associated detected signal, and an individual resistor and a pair of diodes for each of said tsations coupled to a point of the associated relay.

5. The system of claim 2 wherein a pair of diodes having the same station designation are connected together in said matrix and to a point of the corresponding relay.

References Cited in the file of this patent

UNITED STATES PATENTS

| | | |
|---|---|---|
| 2,672,515 | Barlow | Mar. 16, 1954 |
| 2,675,427 | Newby | Apr. 13, 1954 |
| 2,724,019 | Gohorel | Nov. 15, 1955 |
| 2,739,187 | Holden | Mar. 20, 1956 |
| 2,749,387 | Barlow et al. | June 5, 1956 |
| 2,782,259 | Dimond | Feb. 19, 1957 |
| 2,808,459 | Barlow et al. | Oct. 1, 1957 |
| 2,849,538 | Kohler | Aug. 26, 1958 |
| 2,872,524 | Aigrain | Feb. 3, 1959 |
| 2,877,311 | Morris et al. | Mar. 10, 1959 |
| 2,889,410 | Hatton | June 2, 1959 |
| 2,912,511 | McKim | Nov. 10, 1959 |

FOREIGN PATENTS

| | | |
|---|---|---|
| 777,099 | Great Britain | June 19, 1957 |